(12) United States Patent
Manke et al.

(10) Patent No.: US 9,447,877 B2
(45) Date of Patent: Sep. 20, 2016

(54) MOUNTING ARRANGEMENT FOR A PISTON-CONNECTING ROD ASSEMBLY IN A REFRIGERATION COMPRESSOR

(75) Inventors: Adilson Luiz Manke, Joinville (BR); Gelson Longo, Joinville (BR); Fabiano Domingos Silva, Joinville (BR)

(73) Assignee: Whirlpool S.A., São Paulo-Sp (BR)

( * ) Notice: Subject to any disclaimer, the term of this patent is extended or adjusted under 35 U.S.C. 154(b) by 375 days.

(21) Appl. No.: 14/125,700

(22) PCT Filed: Jun. 15, 2012

(86) PCT No.: PCT/BR2012/000199
§ 371 (c)(1),
(2), (4) Date: Jan. 29, 2014

(87) PCT Pub. No.: WO2012/171089
PCT Pub. Date: Dec. 20, 2012

(65) Prior Publication Data
US 2014/0202326 A1    Jul. 24, 2014

(30) Foreign Application Priority Data

Jun. 15, 2011    (BR) .................................... 1102854

(51) Int. Cl.
| F16J 1/14 | (2006.01) |
|---|---|
| F16J 1/18 | (2006.01) |
| F04B 39/00 | (2006.01) |
| F04B 39/14 | (2006.01) |
| F04B 53/14 | (2006.01) |
| F04B 53/22 | (2006.01) |

(52) U.S. Cl.
CPC .............. *F16J 1/18* (2013.01); *F04B 39/0005* (2013.01); *F04B 39/0022* (2013.01); *F04B 39/14* (2013.01); *F04B 53/14* (2013.01); *F04B 53/144* (2013.01); *F04B 53/147* (2013.01); *F04B 53/22* (2013.01); *F05C 2251/02* (2013.01)

(58) Field of Classification Search
CPC .................. F16J 1/14; F16J 1/16; F16J 1/18; F04B 39/0005; F04B 39/023; F04B 39/14; F04B 53/147
See application file for complete search history.

(56) References Cited

U.S. PATENT DOCUMENTS

| 2,396,084 A | 3/1946 | Clark |
|---|---|---|
| 4,559,686 A | 12/1985 | Kessler |
| 4,964,332 A | 10/1990 | Sawyer |
| 5,499,571 A | 3/1996 | Dreiman |
| 5,542,341 A * | 8/1996 | Monk ........................ F16J 1/16 92/187 |
| 5,730,044 A | 3/1998 | Oh |

FOREIGN PATENT DOCUMENTS

| GB | 608380 A | 9/1948 |
|---|---|---|
| JP | 60 125783 | 7/1985 |

OTHER PUBLICATIONS

International Search Report and Written Opinion, International Application No. PCT/BR2012/000199 dated Oct. 19, 2012.
* cited by examiner

*Primary Examiner* — Michael Leslie
(74) *Attorney, Agent, or Firm* — Dinsmore & Shohl LLP

(57) ABSTRACT

The arrangement is applied to a compressor which comprises: a crankcase, carrying a cylinder provided with a lateral slot and in which is housed a piston provided with two radial holes and with an eccentric axial hole; a connecting rod connected to a crankshaft driven by an electric motor and having a smaller eye mounted in the piston; and a wrist pin having a first end turned to the bearing hub of the crankcase, a second end turned to the lateral slot of the cylinder and a diametrical hole, adjacent to the second end in which is provided an engaging means, for the axial and rotational coupling of a tool for mounting and indexing the wrist pin, in the interior of the piston, in a position in which the diametrical hole is axially aligned with the eccentric axial hole, so as to allow an elastic pin to be introduced in said diametrical hole and in said eccentric axial hole.

10 Claims, 4 Drawing Sheets

MOUNTING ARRANGEMENT FOR A PISTON-CONNECTING ROD ASSEMBLY IN A REFRIGERATION COMPRESSOR

FIELD OF THE INVENTION

The present invention refers to a mounting arrangement for providing the coupling of a piston to the smaller eye of a connecting rod which has a larger eye mounted to a crankshaft of a refrigeration compressor, of the reciprocating type, and comprising a crankcase, suspended in the interior of a shell and carrying a bearing hub and a cylinder, in the interior of which the piston is displaced by the connecting rod, in a reciprocating movement, upon the driving of the crankshaft by an electric motor carried by the crankcase.

PRIOR ART

It has been continuous the search for solutions aiming to increase the energy efficiency of reciprocating compressors used in small household and commercial refrigeration systems. One of the ways to obtain increased energy efficiency is by reducing the mechanical losses of the movable components, such as the one produced by the relative movement between the surfaces of a tribological pair. Said mechanical losses refer to the losses by contact and to the losses by viscous friction between the surfaces of the tribological pair. It should be noted that the coefficient of dynamic friction produced by the lubricated contact between two surfaces is, at minimum, one order of magnitude higher than the viscous friction coefficient in a thick-film regime, for metal components with conventional finishing by grinding and/or burnishing, as it occurs with the mutually confronting surfaces of the piston and cylinder, and also of other relatively moving and frictioning components of the compressor, for example, between the crankshaft and the bearings.

Mainly in the first operating hours of the compressor, there occurs a considerable amount of mechanical loss, due to friction generated by the mutual contact of said surfaces, caused by inadequate surface finishing, great shape errors or undersizing of the crankshaft bearings.

Depending on the intensity of said contact under friction, there may occur a degeneration of the surfaces (mechanical, geometric and surface finishing properties), leading to failure of the bearings by wear.

One of the development lines of compressors with high efficiency energy is directed to improve the geometric quality of the components used, mainly the geometric quality of the assembly of said components. This development line takes care of errors of centralization (for example, concentricity, co-axiality, impacts, etc.), errors of shape (for example, circularity, cylindricity, planeness, etc.) and errors of position (for example, parallelism, perpendicularity, etc.).

In the reciprocating refrigeration compressors of the type considered herein, the piston is coupled to the smaller eye of the connecting rod by means of a wrist pin, transversal to the axis of the piston and which has its opposite end portions introduced and retained in respective radial holes provided in the piston, in diametrically opposite positions.

In some compressor models, the fixation of the wrist pin in the piston is obtained by interference fit between one of the end portions of the wrist pin and one of the diametrically opposite radial holes of the piston.

However, the higher the degree of interference between the wrist pin and the piston, so as to guarantee the reliable fixation of said pin, the higher will be the degree of deformation (by errors of circularity and cylindricity) produced on the cylinder surface of the piston, that is, on its bearing surface.

One of the known ways of minimizing deformations resulting from a fixation, by interference, between the wrist pin and the piston, is the one which uses a wrist pin mounted, without interference, in the diametrically opposite holes of the piston. The retention of the wrist can be obtained, for example, by an elastic pin which is loosely guided in an eccentric axial hole provided in the piston wall, and affixed, by interference, in at least one part of the diametrical extension of a hole in a respective end portion of the wrist pin.

In this known solution, the absence of an interference fit, between the wrist pin and the piston, does not add errors of circularity and cylindricity of the piston in relation to the possible shape errors or deviations resulting from the grinding process of the lateral surface of the piston.

In addition to the benefits mentioned above, the fixation of the wrist pin, by means of an elastic pin, also represents the advantage of allowing the mounting of the smaller eye of the connecting rod (usually in a single-piece) in the interior of the piston, to be the last step in the mounting operation (closing) of the components of the mechanical kit of the compressor.

This known mounting form (closing) of the mechanical kit is usually preferred in relation to other forms which include:

using connecting rods made in two pieces, that is, divided in the rod (web) or in the larger eye;
using bushings mounted between the larger eye and the eccentric portion of the crankshaft;
affixing, through bolts, the bearing hub of the crankshaft to the crankcase;
affixing, to the crankcase and through bolts, a block portion which defines the cylinder.

It should be noted that the use of a single-piece connecting rod is advantageous in terms of increasing the energy efficiency of the compressor, since the connecting rod is used in its final manufacturing form (by sintering or machining), no longer introducing additional geometric errors of shape and position to the mounted component.

This advantage is not achieved when using one of the two-piece connecting rod embodiments (divided in the rod or in the larger eye or including interference bushings), since in this case said component presents an additional mounting error, by deformation or misalignment.

The use of one or more elastic pins for affixing the wrist pin, jointly with the use of a single-piece connecting rod, requires the provision of a slot along part of the cylinder lateral wall, on a side opposite to the bearing hub of the block, so as to enable mounting the connecting rod. This slot is also used for mounting the wrist pin in the piston, through the smaller eye of the single-piece connecting rod, when the smaller eye is already housed in the interior of the piston already mounted in the interior of the cylinder. In this type of solution, it is common the provision of an auxiliary hole in the crankcase, in a position diametrically opposite to that of the lateral slot of the cylinder and dimensioned to allow the introduction of a tool capable of:

defining an axial stop for the wrist pin, limiting its introduction travel through the piston holes, in order to guarantee the axis of the diametrical hole for the mounting of the elastic pin in the wrist pin to be leveled with the axis of the eccentric axial hole of the piston; and producing a rotation of the wrist pin, around its axis, which is necessary to coaxially align the axis of the diametrical hole of the wrist pin with the axis of the eccentric axial hole of the piston lateral wall.

The known constructive solution mentioned above allows the mounting tool to define, simultaneously, a means for the axial and rotational positioning of the diametrical hole of the wrist pin in relation to the eccentric axial hole of the piston. For this purpose, the wrist pin has an end provided with a slit, for the fitting of the tool for the axial and rotational positioning of said wrist pin, and an opposite end close to which is provided the diametrical hole for the interference fit of the elastic pin.

However, the access to the auxiliary hole for adaptation of the axial and rotational positioning tool of the wrist pin is made through the crankcase side against which is mounted the stator of the electric motor. Thus, this prior art solution is only feasible if, upon mounting the connecting rod-piston assembly, the stator of the electric motor is not yet mounted to the crankcase. In this case, the mounting sequence is as follows: mounting all the components of the mechanical kit (piston, connecting rod, crankshaft); mounting the rotor to the crankshaft; and mounting the stator, with centralization in relation to the cylinder face of the rotor.

Documents U.S. Pat. No. 4,406,590 and U.S. Pat. No. 5,730,044 describe constructive solutions in which the cylinder is provided with said lateral slot, on a side opposite to the bearing hub of the crankcase, so as to allow mounting a single-piece connecting rod and the wrist pin, through the smaller eye of said single-piece connecting rod and in the opposite holes of a piston already housed in the interior of the cylinder.

In the construction suggested in document U.S. Pat. No. 4,406,590, the axial positioning for mounting the U-shaped elastic ring is obtained by the inner face of the piston lateral wall. The elastic ring is fitted, through the open end of the piston, in a circumferential groove of the wrist pin and dimensioned to project radially outwardly from said groove. Thus, the final axial retention of the wrist pin is obtained by seating the elastic ring against the adjacent inner face of the piston and against the adjacent lateral face of the smaller eye of the connecting rod.

Although not requiring the use of an axial and rotational positioning tool, for mounting the wrist pin, this prior art solution presents the inconvenience of requiring mounting the U-shaped elastic ring through the interior of the piston, in a complex operation due to the difficult access, mainly in compressors with pistons presenting the diameter inferior to 26.0 mm.

On the other hand, in the construction suggested in document U.S. Pat. No. 5,730,044, there are provided two elastic pins inserted, under interference, in respective eccentric axial holes of the piston, each of which diametrically crossing a respective radial hole of the piston. In this prior art solution, one of the elastic pins is introduced and retained in the interior of the respective eccentric axial hole of the piston, before mounting the latter in the cylinder. Each end of the wrist pin is provided with a diametrical slit coplanar to the slit of the other end.

Only after the piston, already carrying the first elastic pin, has been housed in the cylinder and the smaller eye of the connecting rod has been mounted in the interior of the piston, the wrist pin is fitted through the radial holes of the piston and of the smaller eye of the connecting rod, to have the diametrical slit of its leading end seated and fitted on the portion of the first elastic pin, which operates as a means for the axial positioning of the wrist pin. The rotational positioning of the wrist pin can be made by a tool positioned externally to the lateral slot of the cylinder, acting in the diametrical slit of the trailing end of the wrist pin, without causing interference with the stator of the electric motor, in case this has already been affixed to the crankcase. After inserting the wrist pin, the second elastic pin is inserted in the respective eccentric axial hole of the piston, along the interior of the diametrical slit of the trailing end of the wrist pin.

However, this prior art solution presents, as one of its drawbacks, the fact that the elastic pins are not introduced and retained, by interference, in respective diametrical holes of the piston, but only in the eccentric axial holes of the piston. There is no interference in the fitting of each elastic pin in its housing in the wrist pin. This characteristic requires that the eccentric axial holes of the piston have a length which guarantees the fixation by interference with the elastic pin, increasing the length and the total mass of the piston.

Other inconvenience of said prior art solution results from the fact that the axial positioning of the wrist pin is obtained by the provision of an elastic pin specific for this purpose, with the consequent mandatory provision of a second eccentric axial hole in the piston.

A further inconvenience of the solution commented above comes from the fact that the wrist pin has the two end diametrical slits aligned with the axis of the elastic pins. Thus, said diametrical slits are positioned exactly on the bearing area of the wrist pin in the opposite radial holes of the piston, which is not desirable. This arrangement reduces the surface of the wrist pin which acts as a bearing in each radial hole of the piston.

SUMMARY OF THE INVENTION

In view of the drawbacks mentioned above and related to the prior art mounting arrangements for a piston-connecting rod assembly, it is one of the objects of the present invention to provide a mounting arrangement of the smaller eye of a single-piece connecting rod around the pin of a reciprocating piston, by means of relatively less complex and less costly operations, which are capable of leading to a reliable and strong fixation of the wrist pin, by using only one elastic pin of simple construction.

It is a further object of the invention to provide a mounting arrangement with the advantageous characteristics cited above, which does not impair the bearing surfaces of the wrist pin in the opposite radial holes of the piston.

These and other objects of the present invention are achieved when applied to a refrigeration compressor of the reciprocating type, comprising a crankcase which defines a bearing hub and carries a cylinder, which is provided with a lateral slot on a side opposite to the bearing hub of the crankcase; a piston reciprocating in the interior of the cylinder and provided with two diametrically opposite radial holes, and with at least one eccentric axial hole; a connecting rod, having a smaller eye mounted in the interior of the piston; a wrist pin having a first end turned to the bearing hub of the crankcase and disposed in the interior of a radial hole of the piston, and a second end turned to the lateral slot of the cylinder and disposed in the interior of other radial hole of the piston, said wrist pin being also provided with a diametrical hole, which may be a through-hole or not, adjacent to said second end and to be axially aligned with the eccentric axial hole of the piston; and an elastic pin to be introduced in the eccentric axial hole of the piston and through the diametrical hole of the wrist pin.

According to the invention, the second end of the wrist pin is provided with an engaging means for the axial and rotational coupling of a tool, for mounting and indexing the wrist pin in the interior of the piston, in a position in which the diametrical hole is maintained axially aligned with the eccentric axial hole of the piston, so as to allow mounting the elastic pin for fixation of the wrist pin in the interior of the radial holes of the piston.

The construction proposed by the present invention and defined above, allows the indexed mounting of the wrist pin, by the side of the crankcase which is opposite to that in which the stator of the electric motor of the compressor is already affixed, using only one elastic pin which is introduced and retained, by interference, in the interior of the diametrical hole of the wrist pin, without the application of deforming forces in the skirt region of the piston.

BRIEF DESCRIPTION OF THE DRAWINGS

The invention will be described below, with reference to the enclosed drawings in which.

DESCRIPTION OF THE INVENTION

Figure 1:
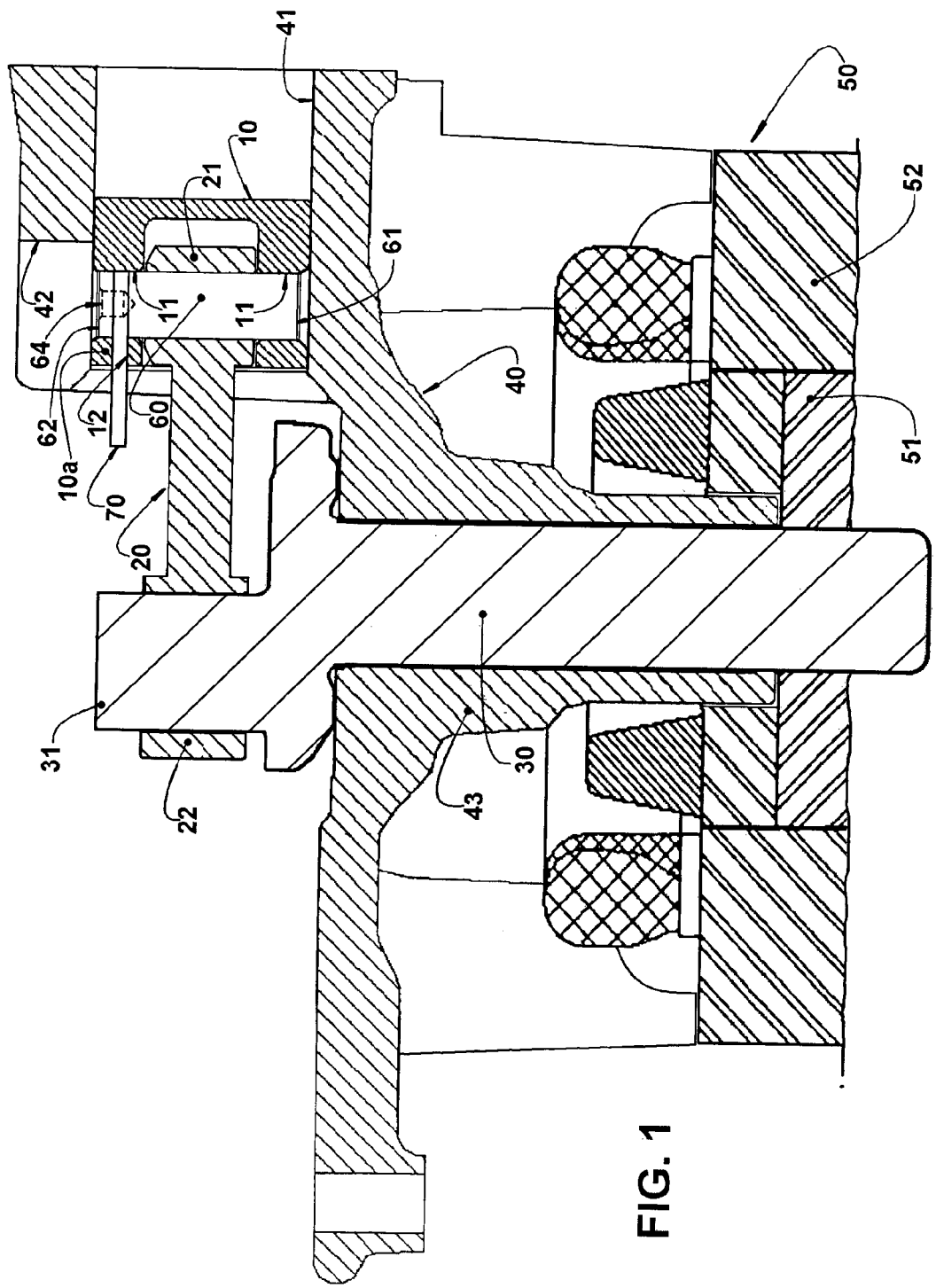
FIG. 1 represents, in a vertical and partial sectional view, a refrigeration compressor comprising a crankcase carrying a cylinder, a piston reciprocating in the interior of the cylinder, a crankshaft mounted in the crankcase and connected to the piston by means of a connecting rod and a wrist pin, said crankcase affixing the stator of an electric motor, whose rotor is affixed to the crankshaft.

As illustrated and already previously described, the present mounting arrangement refers to the coupling of a piston 10 to the smaller eye 21 of a single-piece connecting rod 20, whose larger eye 22 is mounted around an eccentric portion 31 of a crankshaft 30 of a refrigeration compressor.

The refrigeration compressor, to which the present arrangement is applied, can be of the type which comprises a crankcase 40 which carries a cylinder 41 in the interior of which the piston 10 is displaced by the connecting rod 20, in a reciprocating movement, upon the driving of the crankshaft 30 by an electric motor 50, having its rotor 51 affixed to the crankshaft 30 and its stator 52 affixed to the crankcase 40, around the rotor 51.

The crankcase 40 also carries a bearing hub 43, in the interior of which is mounted the crankshaft 30.

The coupling of the smaller eye 21 of the connecting rod 20 to the piston 10 is obtained by means of a generally massive wrist pin 60. This wrist pin 60 has opposite end portions introduced, without interference, and retained in respective diametrically opposite radial holes 11 provided through the respective portions of a lateral wall 10a of the piston 10, said lateral wall presenting an outer cylindrical surface 10b. The median portion of the wrist pin 60 is disposed through the smaller eye 21 of the connecting rod 20.

In this type of compressor construction, the cylinder 41 is provided with a lateral slot 42 disposed in a longitudinal mode, in the region of the cylinder 41 disposed on a side opposite to the bearing hub 43 of the crankcase 40, that is, said region turned to the side of the crankcase 40 opposite to that in which the stator 52 of the electric motor 50 is affixed.

As illustrated in FIG. 1, the lateral slot 42 allows mounting the single-piece connecting rod 20 in the interior of the piston 10 already positioned in the interior of the cylinder 41, in the lower dead point position, at the end of the suction stroke. This known construction allows the wrist pin 60 to have a first end 61 introduced through the lateral slot 42 of the cylinder 41, of the adjacent radial hole 11 of the piston 10, of the smaller eye 21 of the connecting rod 20, and in the interior of the opposite radial hole of the piston 10, until reaching the correct axial positioning of the wrist pin 60 in the piston 10, with a second end 62 of the wrist pin 60 being operatively associated with a mounting tool 80 (see FIGS. 2 and 2A) and positioned, at the end of the mounting axial travel, in the interior of a respective radial hole 11 of the piston 10, as illustrated in FIG. 1.

As mentioned in the introduction of the present specification, the wrist pin 60 has its opposite end portions introduced, without mechanical interference, in the respective radial holes 11 of the piston 10. Thus, there is the need to axially retain the wrist pin 60 in the radial holes 11 of the piston 10, so as to guarantee no contact to occur between the wrist pin 60 and the inner surface of the cylinder 41 of the crankcase 40.

The constructive solution used in the present invention is that of the type which provides an eccentric axial hole 12 in the lateral wall 10a of the piston 10, which hole 12, upon the mounting of the piston 10 in the cylinder 41, is turned to the lateral slot 42. In this eccentric axial hole 12 is introduced, with little or no interference, an elastic pin 70.

The wrist pin 60 is provided with a diametrical through hole 63 disposed close to the second end 62 of the wrist pin 60, so as to be axially aligned with the eccentric axial hole 12 of the piston 10, upon the final positioning of the wrist pin 60 in relation to the piston 10. In this condition, the elastic pin 70 can be introduced in the eccentric axial hole 12 of the piston 10 and through the diametrical hole 63, guaranteeing the axial and rotational retention of the wrist pin 60 in its final and correct positioning in the piston 10.

The elastic pin 70 is introduced through the eccentric axial hole 12 of the piston 10, preferably without mechanical interference, the axial retention of the elastic pin 70 being guaranteed by its introduction, with interference, through the diametrical hole 63 of the wrist pin 60. Thus, it is obtained a reliable axial retention of the elastic pin 70 to the wrist pin 60, without applying any relevant deforming force in the skirt region of the piston 10.

According to the present invention and aiming at allowing the tool 80, for axially and rotationally positioning the wrist pin 60, to be operated by the side of the crankcase 40 opposite to that side for the fixation of the stator 52 of the electric motor 50, the second end 62 of the wrist pin 60 is also provided with an engaging means 64, which is configured to allow the mounting and indexing tool 80 (see FIGS. 2 and 2A) to be coupled to said second end 62 of the wrist pin 60, to axially displace it until a position in which the axis of the diametrical hole 63 of the wrist pin 60 becomes coplanar to the axis of the eccentric axial hole 12 of the piston 10, and also to angularly displace said wrist pin 60, around its axis, so that its diametrical hole 63 has its axis disposed according to a direction coaxial to that of the eccentric axial hole 12 of the piston 10.

It should be understood that the axial and angular displacements of the wrist pin 60 can be made simultaneously, or one after the other, in any order, as long as the diametrical hole 63 of the wrist pin 60 is coaxially aligned with the eccentric axial hole 12 of the piston 10.

Considering that the engaging means 64, provided in the second end 62 of the wrist pin 60, generally provides only the rotational engagement of the latter to the tool 80, while said tool is axially pushing the wrist pin 60 to its mounting position in the piston 10, upon the mounting of the wrist pin 60 by a descending axial displacement, it is necessary that the tool 80 be provided with a fixation means, working magnetically or by interference, to the engaging means 64 of the wrist pin 60, so that the latter remains connected to the tool 80, during the axial and rotational displacement of said tool 80, to provide the angular and axial indexing of the wrist pin 60 in relation to the eccentric axial hole of the piston 10.

The engaging means 64 of the wrist pin 60 can present different constructions, provided that it allows the tool 80 to axially push and angularly rotate the wrist pin 60 to its final mounting position in the piston 10.

The end of the axial travel of the tool 80 occurs when said tool touches the outer cylindrical surface 10b of the piston 10, as better described ahead. Said outer cylindrical surface 10b defines a travel end stop against which the tool 80 is seated. Through the correct dimensioning of the dimensions and tolerances, it is possible to guarantee the axial alignment of the axes of the holes for mounting the elastic pin 70.

Alternatively, the whole mechanical kit can be rotated, so that the process of inserting the wrist pin 60 occurs in the sense opposite to the weight force produced by gravity. In this case, the fixation means, working magnetically or by interference, to the engaging means 64 of the wrist pin 60, can be eventually dispensed.

Figure 3:
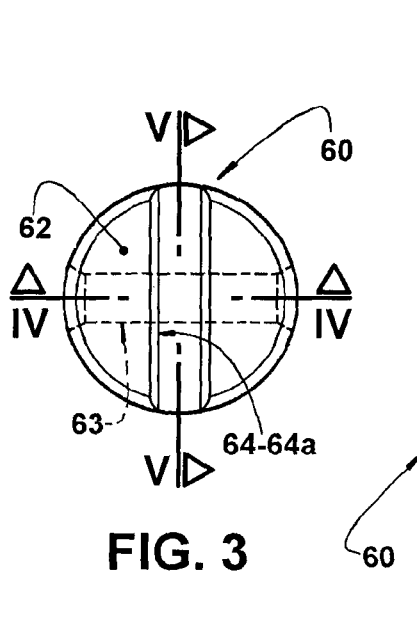
FIG. 3 represents an end view of the wrist pin constructed according to a first embodiment of the present invention.
Figure 4:
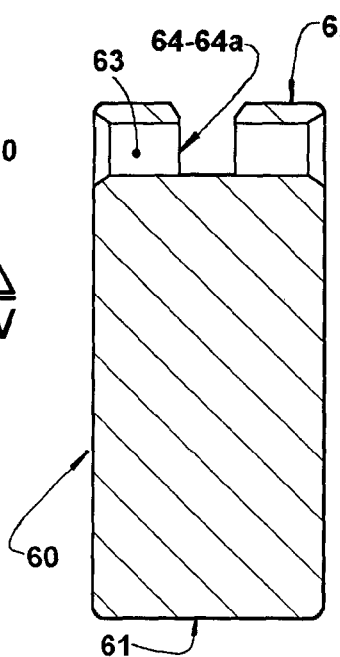
FIG. 4 represents a longitudinal sectional view of the wrist pin, said section taken according to line IV-IV in FIG. 3.
Figure 5:
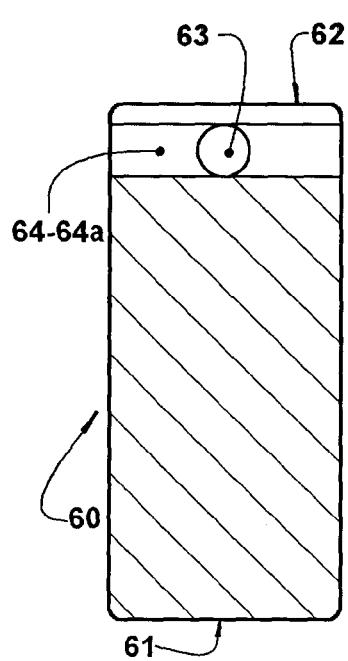
FIG. 5 represents a longitudinal sectional view of the wrist pin, said section taken according to line V-V in FIG. 3.

In the first embodiment illustrated in FIGS. 3, 4 and 5, the engaging means 64 takes the form of a diametrical slit 64a provided in the second end 62 of the wrist pin 60. In this case, the tool 80 can take the form of a screwdriver, with its end magnetized or configured to be coupled, with a certain mechanical interference, in the interior of the diametrical slit 64a.

Although the first embodiment has a relatively simple construction, it presents the inconvenience of allowing the diametrical slit 64a to intercept the diametrical hole 63 of the wrist pin 60, which can generate burrs in the intersection regions during the process for obtaining, generally by machining, the diametrical hole 63 and the diametrical slit 64a.

Figure 6:
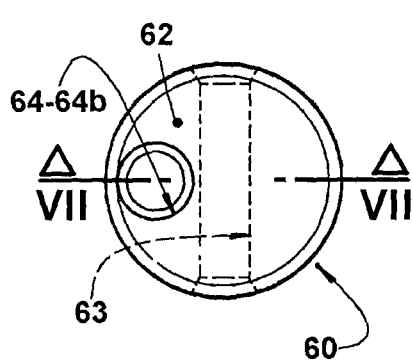
FIGS. 6 and 7 represent, respectively, an end view and a longitudinal sectional view of a wrist pin, constructed according to a second embodiment of the present invention, said section being taken according to line VII-VII in FIG. 6.
Figure 7:
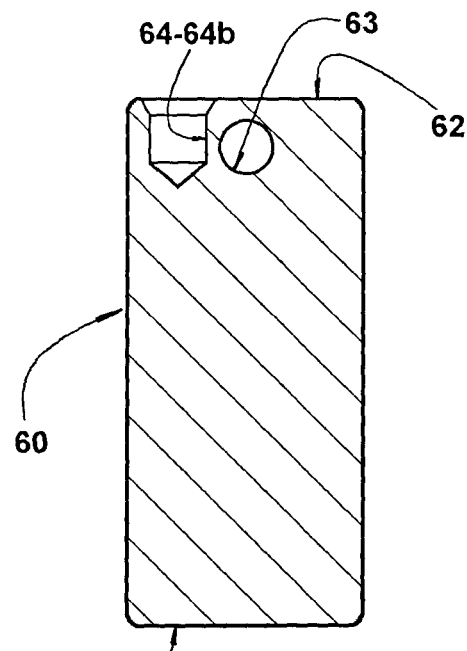

In a second embodiment, illustrated in FIGS. 6 and 7, the engaging means 64 takes the form of a recess 64b which, on being eccentric, can present a circular contour in the form of a blind axial hole, provided in the second end 62 of the wrist pin 60. The recess 64b can present different polygonal contours, which allow the axial and rotational coupling with the mounting and indexing tool 80.

In the construction in which the recess 64b is eccentric in relation to the center of the contour of the second end 62 of the wrist pin 60 and presents a circular contour, the tool 80 can present an end 81, to be seated against the second end 62 of the wrist pin 60 and incorporating a small axial projection 82, which can take the form of an eccentric pin, to be fitted in the recess 64b. The angular rotation of the tool 80 will produce the angular displacement of the wrist pin 60, so that the axis of its diametrical hole 63 occupies a direction coaxial to that of the axis of the eccentric axial hole 12 of the piston 10. In this second embodiment, there is no interference between the diametrical hole 63 and the engaging means 64 defined by the recess 64b. In other words, the engaging means 64, defined by the recess 64b, is provided in a region of the wrist pin 60 different from that region in which the diametrical hole 63 is provided.

In this second embodiment, illustrated in FIGS. 6 and 7, the engaging means 64 is defined in a region of the second end 62, of the wrist pin 60, radially internal to the peripheral contour of said second end 62, without altering the surface of the adjacent end portion of the wrist pin 60 which actuates as a bearing.

Figure 8:
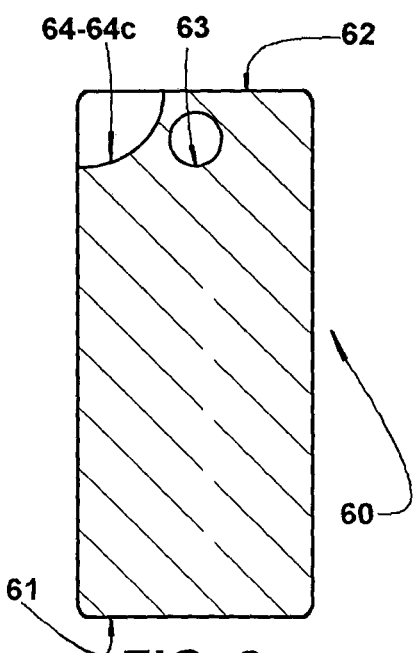
FIG. 8 represents a longitudinal sectional view of a wrist pin, constructed according to a third embodiment, derived from the second embodiment illustrated in FIGS. 6 and 7.

As illustrated in FIG. 8, the engaging means 64 can take the form of an eccentric recess 64c positioned adjacent to the contour of the second end 62 of the wrist pin 60, so as to define a chamfer or cutout in a region of the peripheral edge of said second end 62.

The engaging means 64 can take different forms and be defined by multiple elements provided in the second end 62 of the wrist pin 60, close to said second end 62 being provided the diametrical hole 63. The engaging means should be defined as a function of the benefits associated with the process of mounting, with the axial and angular indexing of the wrist pin 60 in the piston 10, and as a function of the benefits of the process for forming the engaging means 64 in said second end 62 of the wrist pin 60.

Figure 9:
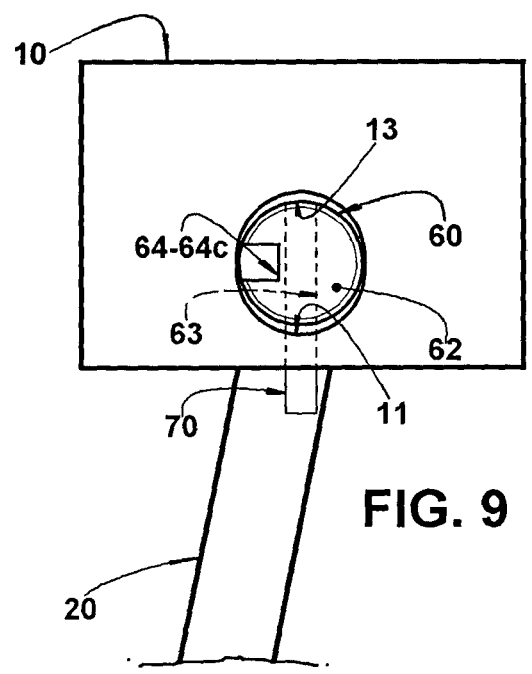
FIG. 9 represents a schematic lateral view of a piston-single-piece connecting rod assembly, illustrating the bearing regions of the end portions of the wrist pin in relation to the forces transmitted between the wrist pin and the piston during the operation of the compressor.

As already described in the comments regarding the prior art, the process for affixing the wrist pin 60 to the piston 10, by means of an elastic pin 70, is usually associated with the mounting, without interference, of the opposite end portions of the wrist pin 60 in the respective opposite radial holes of the piston 10. Thus, the cylindrical surfaces, of the two opposite end portions of the wrist pin 60, also define functional surfaces, acting as tribological pairs (bearings) which transmit the force generated by the torque of the electric motor 50 to the piston 10, as illustrated in FIG. 9.

In view of the above, it is preferred that the engaging means 64 does not alter the surface of the adjacent end portion of the wrist pin 60 which acts as a bearing. In the first embodiment, illustrated in FIGS. 3, 4 and 5, the diametrical slit 64a, which defines the engaging means 64, extends until the peripheral edge of said second end 62, altering the surface of the adjacent end portion of the wrist pin 60, to be mounted in the respective radial hole of the piston 10. In this case, the diametrical slit 64a should be positioned according to a direction transversal to that of the axis of the diametrical hole 63 which receives the elastic pin 70, since, in this case, the cutouts formed in said surface of the wrist pin 60 are located in a region of the latter which does not act as a bearing surface, as illustrated in FIG. 9. The main bearing region is located in an arc 13 of 90 degrees, in the radial holes 11 of the piston 10.

In the cases in which the engaging means 64, constructed in the form of a diametrical slit 64a, of an eccentric recess 64c, of a chamfer 64c, or in any other form, is positioned adjacent to the contour of the second end 62, the engaging means 64 is positioned in a radial direction in the second end 62 of the wrist pin 60, transversal to the direction of the axis of the diametrical hole 63.

Figure 2:
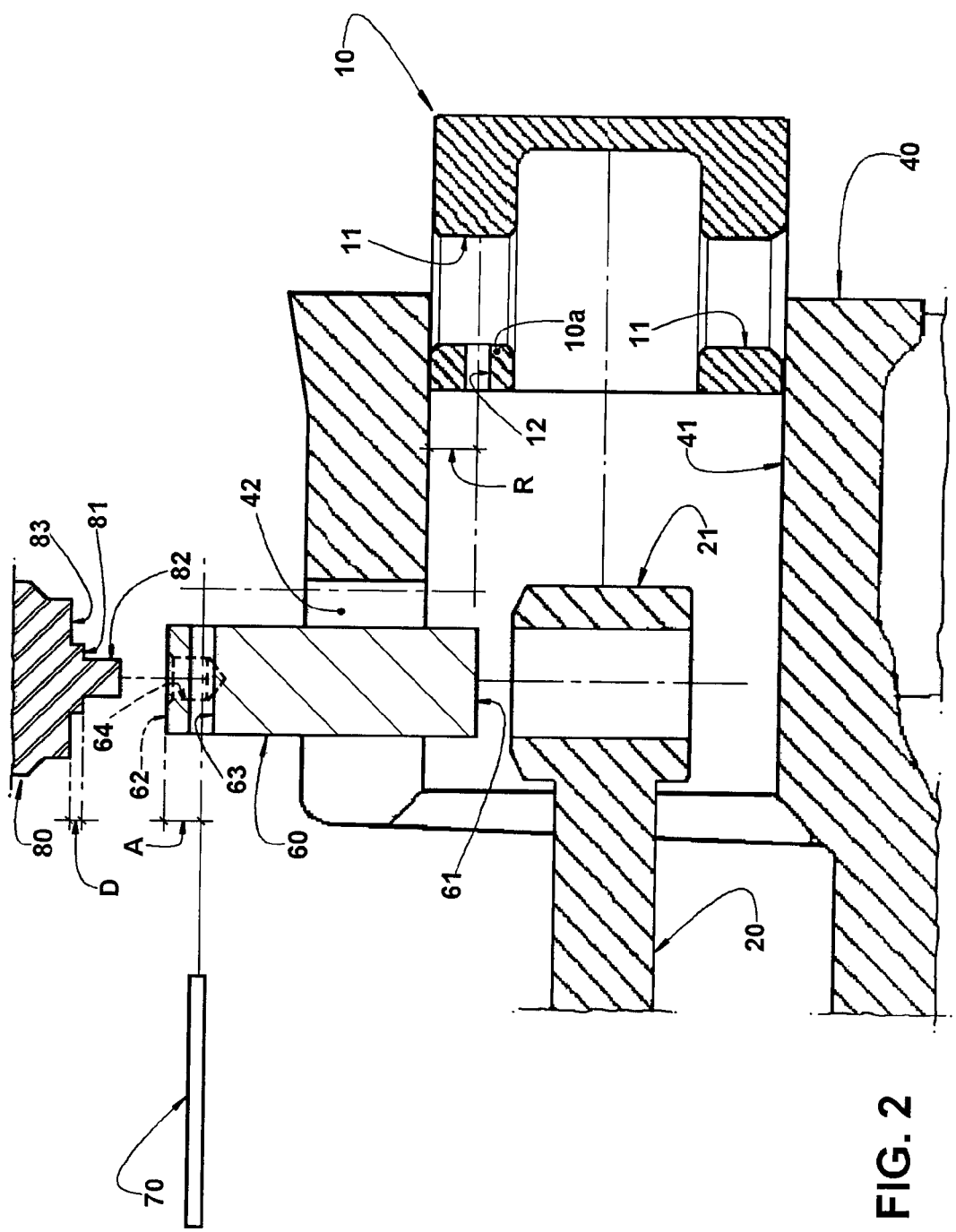
FIG. 2 represents, in a vertical sectional view, a portion of the crankcase and of the single-piece connecting rod of FIG. 1, also illustrating, in an exploded mode, the wrist pin, the piston and an elastic pin used in the mounting arrangement of the present invention.
Figure 2A:
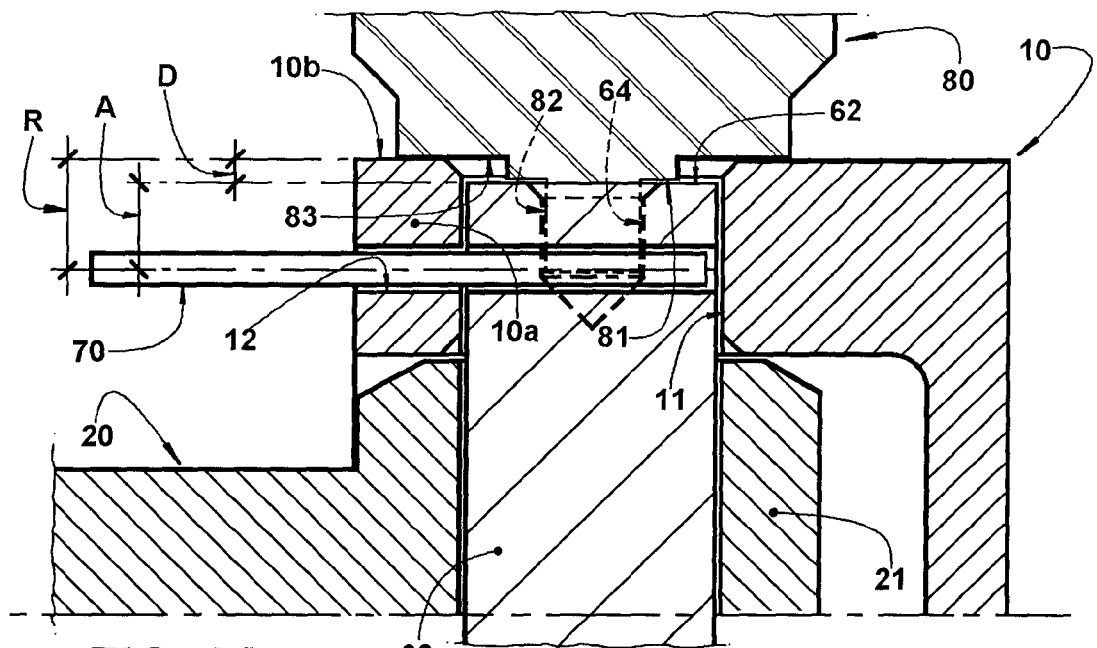
FIG. 2A represents a partial sectional view of the wrist pin, mounted in one of the radial holes of the piston, and a constructive detail of the mounting tool, indicating the dimensions necessary to analyze the chain of tolerances of the axial alignment of the wrist pin.

As already mentioned and illustrated in FIGS. 2 and 2A, the tool 80 is constructed so as to present the end 81 configured to be seated against the second end 62 of the wrist pin 60, during the mounting of the latter through the lateral slot 42 of the cylinder 41 and in the interior of the radial holes 11 of the piston 10. Thus, the second end 62 of the wrist pin 60 defines a seat for the end 81 of the tool 80.

The end 81 of the tool 80 incorporates at least one axial projection 82, which can take different forms compatible with the shape of the engaging means 64 provided in the second end 62 of the wrist pin 60.

The tool 80 also presents, in the region of said end 81, a peripheral shoulder 83, circumscribed and axially spaced back in relation to the end 81 of the tool 80, by an axial distance D equal to the difference between the radial spacing R of the axis of the eccentric axial hole 12 of the piston 10, in relation to the outer cylindrical surface 10b of the latter, and the axial spacing A between the axis of the diametrical hole 63 of the wrist pin 60 and the second end 62 of the latter. In other words, the tool 80 has the back spacing of its peripheral shoulder 83 dimensioned so as to guarantee the relation D=R−A.

Thus, and as illustrated in FIG. 2A, the tool 80 has its end 81 seated against the second end 62 of the wrist pin 60, being then axially displaced to push the wrist pin 60 until the peripheral shoulder 83 is seated against the outer cylindrical surface 10b of the piston 10, when the axes of the diametrical hole 63 of the wrist pin 60 and of the eccentric axial hole 12 of the piston 10 become coplanar, regardless whether they are coaxially aligned or not.

The angular rotation of the tool 80, which can be made at any step of the sequence of mounting and indexing the wrist pin 60, will produce the angular displacement of the latter, which is necessary to allow the axis of its diametrical hole 63 to occupy a direction coaxial to that of the axis of the eccentric axial hole 12 of the piston 10.

Thus, the axial alignment of the diametrical hole 63 of the wrist pin 60 with the eccentric axial hole 12 of the piston 10 starts to be obtained from a chain of tolerances with three dimensions.

A first dimension is defined by the axial distance D between the end 81 and the peripheral shoulder 83 of the tool 80.

A second dimension is defined by the radial spacing R of the axis of the eccentric axial hole 12 in relation to the outer cylindrical surface 10b of the piston 10.

A third dimension is defined by the axial spacing A between the axis of the diametrical hole 63 and the second end 62 of the wrist pin 60.

While only three possible embodiments for the present engaging means 64 provided in the wrist pin 60 have been illustrated, it should be understood that different constructive forms for said engaging means 64 can be used, without departing from the inventive concept defined in the claims that accompany the present specification.

The invention claimed is:

1. A mounting arrangement for a piston-connecting rod assembly in a refrigeration compressor of the type which comprises a crankcase which defines a bearing hub and carries a cylinder provided with a lateral slot on a side opposite to the bearing hub; a piston, having an outer cylindrical surface and reciprocating in the interior of the cylinder and provided with two diametrically opposite radial holes and with an eccentric axial hole; a connecting rod having a smaller eye mounted in the interior of the piston; a wrist pin having a first end turned to the bearing hub and disposed in the interior of a radial hole of the piston, and a second end turned to the lateral slot of the cylinder and disposed in the interior of the other radial hole of the piston, said wrist pin being also provided with a diametrical hole, adjacent to said second end and to be axially aligned with the eccentric axial hole of the piston; and an elastic pin to be introduced in the eccentric axial hole of the piston and through the diametrical hole of the wrist pin, said arrangement being characterized in that the second end of the wrist pin is provided with an engaging means for the axial and rotational coupling of a tool, for mounting and indexing the wrist pin in the interior of the piston, the outer cylindrical surface of the piston defining a travel end stop against which is seated the tool, in a condition in which the diametrical hole of the wrist pin has its axis coplanar to the axis of the eccentric axial hole of the piston.

2. The mounting arrangement, as set forth in claim 1, characterized in that, during the mounting of the wrist pin, in the interior of the two diametrically opposite radial holes of the piston, the second end of the wrist pin defines a seat for an end of the tool, and the outer cylindrical surface of the piston defines the travel end stop against which is seated a peripheral shoulder of the tool, circumscribing and axially spaced back in relation to the end of the tool, by an axial distance (D) equal to the difference between the radial spacing (R) of the axis of the eccentric axial hole of the piston, in relation to the outer cylindrical surface of the piston, and a radial spacing (A) between the axis of the diametrical hole of the wrist pin and the second end thereof.

3. The mounting arrangement, as set forth in claim 1, characterized in that the engaging means is defined in a region, of the second end of the wrist pin, radially internal to a peripheral contour of said second end.

4. The mounting arrangement, as set forth in claim 3, characterized in that the engaging means takes the form of a recess.

5. The mounting arrangement, as set forth in claim 4, characterized in that the recess is positioned eccentrically in relation to the center of a contour of the second end of the wrist pin.

6. The mounting arrangement, as set forth in claim 5, characterized in that the engaging means is provided in a region of the wrist pin which is different from that in which the diametrical hole is provided.

7. The mounting arrangement, as set forth in claim 1, characterized in that the engaging means is positioned adjacent to a contour of the second end of the wrist pin.

8. The mounting arrangement, as set forth in claim 7, characterized in that the engaging means is positioned in a radial direction, in the second end of the wrist pin, transverse to that of the axis of the diametrical hole.

9. The mounting arrangement, as set forth in claim 8, characterized in that the engaging means takes the form of a diametrical slit provided in the second end of the wrist pin.

10. The mounting arrangement, as set forth in claim 8, characterized in that the engaging means takes the form of an eccentric recess, defining a chamfer in a peripheral edge region of said second end of the wrist pin.

* * * * *